3,466,190
METHOD OF MAKING FILMS OF
INORGANIC COMPOUNDS
Toshio Yamashita, Hirakata-shi, Manabu Yoshida, Moriguchi-shi, and Hirokazu Tsukamoto, Sendai-shi, Japan, assignors to Matsushita Electric Industrial Co., Ltd., Kadoma-shi, Osaka, Japan, a corporation of Japan
Filed Feb. 25, 1966, Ser. No. 530,124
Claims priority, application Japan, June 16, 1965, 40/36,465
Int. Cl. H01b 1/02; H01l 3/04
U.S. Cl. 117—201             8 Claims

ABSTRACT OF THE DISCLOSURE

Inorganic semiconductive films, particularly photoconductive films such as cadmium sulfide and the like, are prepared by adding ammonia water to an aqueous solution of at least one water soluble salt of an element of Groups I–B, II–B and III–A to form a soluble complex compound, adding thereto at least one of thiourea, selenurea or dimethyl selenurea, and heating the system to cause the sulfide, selenide or sulfoselenide of one of said elements to deposit as a film on a substrate immersed in the system.

---

Figure 1:
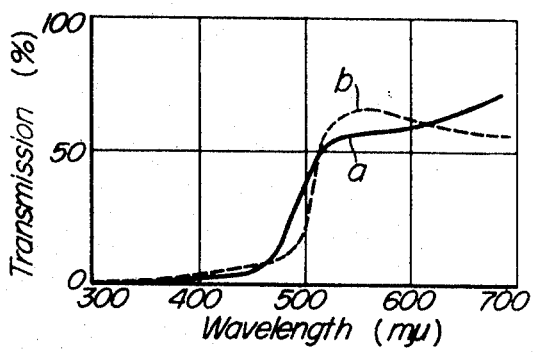

This invention relates to methods of making films of inorganic compounds and has for its object to provide a chemical method of making inorganic semiconductive films, particularly photoconductive films such as cadmium sulfide and cadmium selenide in a uniform and highly efficient manner.

In the past, photoconductive films such as cadmium sulfide and cadmium selenide have been made by different methods including evaporation, sintering and vapor-phase reaction. As is well known, however, any of these methods have been unsatisfactory involving various deficiencies particularly from the standpoint of enabling mass production of uniform films with good reproducibility and by use of simple equipment. This situation has been a serious obstacle to extended industrial utilization of this kind of films.

As for the making of films of such compounds as lead sulfide and lead selenide, a chemical method has also been in use in addition to the methods mentioned above. In practice, however, the application of such chemical method has been restricted to films such as PbS and PbSe for which suitable chemical reactions exist and it has generally been supposed that such method cannot be applied to the manufacture of films of the sulfide or selenide of cadmium or any other element of Group II–B in the Periodic Table.

According to the present invention, novel methods are provided which enables chemical formation of films of such compounds which have previously been supposed impossible to obtain by chemical deposition.

In the chemical deposition of lead sulfide and other compounds between elements of Groups IV–A and VI–A, an excess of sodium hydroxide is added to an aqueous solution of a lead salt to convert the lead hydroxide initially formed therein into a soluble compound and subsequently added to this solution is an aqueous solution of thiourea or the like to cause deposition of lead sulfide at room temperature. This process, however, cannot be applied to cadmium sulfide and other compounds between elements of Groups II–B and VI–B. The reason for this is that, since cadmium hydroxide is not soluble in any excess of sodium hydroxide, cadmium sulfide obtained when an aqueous solution of thiourea is added takes the form of a precipitate but cannot form a deposited layer.

The method according to the present invention is based upon the fact that cadmium hydroxide, when an excess of ammonia water or a solution of a cyanide is added thereto, is transformed into an amino or cyano complex salt which is soluble. Utilizing this fact, ammonia water or a solution of a cyanide is added to an aqueous solution of a cadmium salt in excess so that cadmium hydroxide initially formed therein is dissolved to form an amino or cyano complex compound which is soluble. Added to this is an aqueous solution of thiourea, selenurea or dimethyl selenurea or other homogeneous precipitant and the solution is heated to approximately 100° C. By doing this, it has been found that cadmium sulfide, cadmuim selenide or the like compound can be deposited as a firm and uniform film on a substrate immersed in the solution. Upon this finding, the inventors have confirmed the fact that substantially the same process can be applied to the formation of sulfide or selenide of other elements of group II–B and of elements of other groups such as I–B and III–A, and that in the process addition of an appropriate buffer solution is effective to improve the uniformity of the film formed and to increase its thickness. It has also been found that the films of compounds such as cadmium sulfide and cadmium selenide formed in the manner described above exhibit an extraordinarily high photoconductivity when subjected to an appropriate heat treatment or given proper impurities.

A few practical examples of the present invention will next be described for better understanding of the invention.

EXAMPLE 1

Fifteen cubic centimeters of 0.05-mol aqueous solution of cadmium nitrate, 10 cc. of 14% ammonia water and 10 cc. of 1-mol aqueous solution of thiourea are placed in a vessel and thoroughly agitated. A strip of glass sheet with its surfaces fully degreased is vertically placed in the vessel against its side wall so that the lower portion is immersed in the solution. The mixed solution is then heated by placing the vessel in a hot bath held at about 90° C. In one or two minutes, the solution, initially colorless and transparent, grows yellow in color and as time lapses the color grows darker and flocculent precipitation of cadmium sulfide is started. Simultaneously with this a deposition of cadmium sulfide, yellow and transparent, starts to form on the side wall of the vessel. This reaction is mostly completed in about ten minutes and thereafter substantially no further change takes place. Upon completion of the reaction, the glass strip is taken out of the vesssel and on that portion of the strip previously immersed in the vessel is observed a deposition of cadmium sulfide in the form of a yellow and transparent film firmly adhering to the glass strip. A similar film, yellow and transparent, is also deposited on the side wall of the vessel. By X-ray diffraction and electron-microscope observation, it has been confirmed that the film of cadmium sulfide formed in this manner is composed of fine particles of approximately 0.1μ in size, which are mixed crystals of cubic and hexagonal. The curve $a$ in FIG. 1 illustrates the spectral transmission obtained with such film of cadmium sulfide. This spectrum was varied as shown by curve $b$ in FIG. 1 when the film was heat-treated at 600° C. for 20 minutes in the atmosphere of nitrogen gas. X-ray diffraction of the heat-treated film has revealed that it included crystal particles all of the hexagonal structure. The thickness of the film deposited at a stretch was found to be approximately 1300 A. Also, the photoconductivity of the film before and after the heat treatment was as follows. The film exhibited before the heat treatment a dark resistivity of $5.46 \times 10^4 \Omega$ cm. and a light resistivity of $9.93 \times 10^3 \Omega$ cm. while after the heat treatment it exhibited a higher dark resistivity of $3.68 \times 10^6 \Omega$ cm. and a higher light resistivity of $1.14 \times 10^5 \Omega$ cm. The light responsivity of the film after the heat treatment was extraordinarily fast whereas that before heat treatment was very slow.

In this example, the deposition was effected under conditions supposed to be optimum but in practice conditions for deposition must vary over a considerably wide range.

The cadmium salt in the reaction solution may be $CdCl_2$, $CdBr_2$, $CdSO_4$ or any other salt of cadmium. The results will be quite the same so long as the concentration of cadmium ions is the same. Any change in concentration of the solutions used has a considerable influence upon the particle size, thickness and crystallinity of the film formed. Also, change in the temperature to which the solution is heated has a substantial influence upon the thickness and spectral transmission of the film. At lower temperatures, the reaction speed is reduced markedly and any film of a substantial thickness is unobtainable. Desired deposition can be obtained even at room temperatures but in this case it is desirable to slightly reduce the quantities of the ammonia water and aqueous solution of thiourea used in order to obtain films of a substantial thickness desired.

Figure 2:
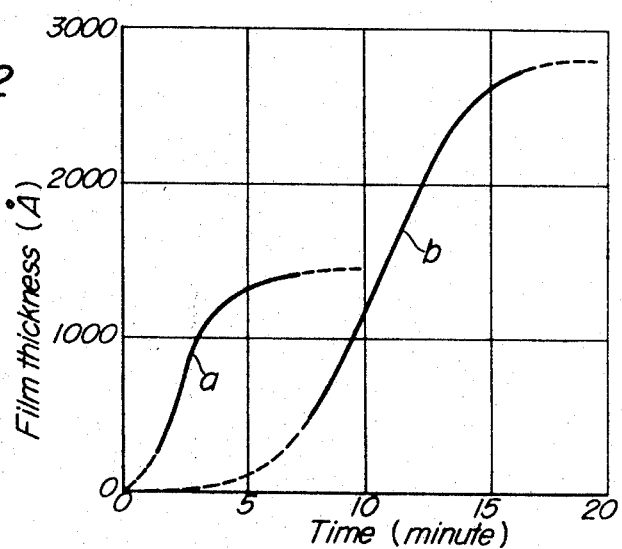

The curve $a$ in FIG. 2 illustrates the relationship between the reaction time and the thickness of CdS film formed under conditions supposed to be optimum. Measurements made on the solution show that the solution exhibited a pH value of approximately 12 before reaction and approximately 10 after reaction.

It will be understood that in the above method the substrate may be formed of various materials including metals, ceramics and glass. Also, it has been found that cadmium selenide can be obtained with ease by the same method, employing a selenium compound such as selenurea or dimethyl selenurea in place of thiourea.

Though, in the above example, the reaction solution was heated for deposition to a temperature of 100° C. or under, the film thickness can be increased, for example, to a value of the order of $1\mu$ simply by hermetically sealing the reaction vessel and heating the solution to a temperature exceeding 100° C. under a pressure exceeding the atmospheric pressure. Also, in cases where deposition is effected at a temperature of 100° C. or under, it is possible to increase the film thickness by adding a reaction solution of an appropriate composition in limited quantities as the reaction proceeds.

EXAMPLE 2

In the first example, the film thickness obtainable at a stroke of deposition is of the order of 1300 A. at the maximum and in order to obtain thicker films it is necessary to repeat the deposition process. In an attempt to obtain thicker films in one deposition process, the inventors have ascertained that the film thickness can be nearly doubled by following a process described below. In this process, the initial value of pH of the reaction solution is maintained throughout the reaction period by adding thereto a small quantity of a highly concentrated buffer solution of pH=10, which includes $NH_4Cl$ and $NH_4OH$. In this case the composition of the reaction solution includes

|  | Cc. |
|---|---|
| 0.05 mol $CdCl_2$ | 15 |
| 14% $NH_4OH$ | 8.5 |
| 1 mol $N_2H_4CS$ | 10 |
| 1.3 mol $NH_4Cl$ <br> 16% $NH_4OH$ } | [1],1.5 |

[1] Buffer solution of pH=10.

Vertically immersed in this solution is a glass strip with its surfaces degreased and the solution is heated to approximately 100° C. for about 20 minutes to complete deposition. In this manner, a firm and uniform film of cadmium sulfide is obtained which is yellow and transparent. Electron-microscopic observations have revealed that in the initial stage of deposition crystals of CdS are deposited uniformly on the substrate as particles of the order of $0.1\mu$ in size, each particle including a number of very minute crystals of CdS. As the reaction proceeds with the particle sizes remaining substantially the same, the film on the substrate increases in density to completely cover the latter and further particles are deposited thereon as overlayers until the reaction is completed to obtain an entire film thickness of the order of approximately 3000 A. The relationship between the film thickness and the reaction time in this process is illustrated in FIG. 2, curve $b$. The film deposited is substantially the same in character as the one obtained in Example 1 but is more or less improved in uniformity and crystallinity and much increased in thickness due to the presence of the buffer solution.

Figure 3:
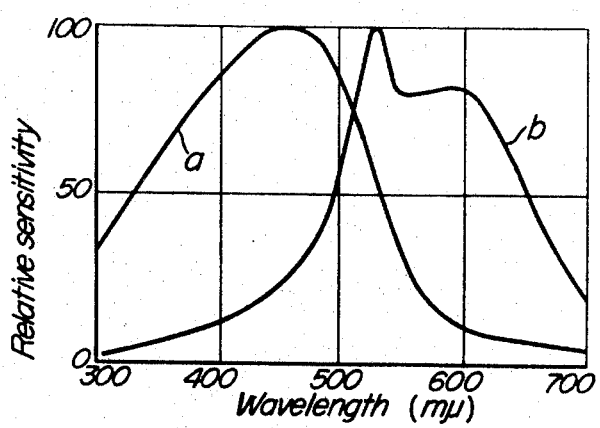

This film was heat-treated at temperatures in the range of from 200° C. to 600° C. for 30 minutes in vacuum, nitrogen gas and air, and it has been found that at temperatures of 500° C. or over the film includes particles mostly of the hexagonal crystal. After heat treatment, the film exhibited a photoconductivity as shown by curve $a$ in FIG. 3, which represents the spectral photoresponse obtained with the film heat-treated. In comparison with a commercially available CdS photoconductive element (shown by curve $b$ in FIG. 3), the deposited film of this invention shows slight decrease in spectral photo response with decreasing wave length shorter than 500 m$\mu$.

EXAMPLE 3

According to the inventive method, impurities can be added with ease to the film. In order to increase the light sensitivity of the deposited film of CdS, it is necessary to add appropriate quantities of donor and acceptor impurities. Examples will next be described in which In and Cu are employed as a donor and an acceptor impurity, respectively.

(I) Incorporation of In

A film of CdS deposited in the manner described in Example 2 is immersed in a solution of the following composition heated to 96° C. to form an eutectoid film of CdS and $In_2S_3$, which is heat treated at 500° C.

|  | Cc. |
|---|---|
| 0.05 mol $CdCl_2$ | 15 |
| 14% $NH_4OH$ | 8.5 |
| 0.2 mol ETA | 1 |
| 0.005 mol $InCl_3$ | 1 |
| 1 mol $N_2H_4CS$ | 10 |

(II) Incorporation of Cu

A film of CdS deposited by the method described in Example 2 is immersed in a solution of the following composition heated to 96° C. to form an eutectoid film of CdS and CuS, which is heat-treated at 500° C.

|  | cc. |
|---|---|
| 0.05 mol $CdCl_2$ | 20 |
| 14% $NH_4OH$ | 5 |
| pH=0 buffer solution | 2 |
| 0.1 mol CuCl | 0.1 |
| 1 mol $N_2H_4CS$ | 20 |
| Distilled water $H_2O$ | 5 |

Though, in above examples, the impurities are deposited together with CdS, they can also be uniformly added by their separate deposition and the subsequent heat treatment.

The film deposited gradually grows light yellow with increase in amount of In added and brown with increase in amount of Cu added.

It has also been found that addition of In decreases the resistivity of the film while addition of Cu markedly increases it.

Also, a photoconductive element having a light sensitivity of $10^6$ or over can readily be obtained by adding both In and Cu.

It will be appreciated from the foregoing description that the method of the present invention is highly advantageous over any conventional method in that uniform films of compounds can be formed with ease by use of a relatively simple equipment and that, no excessively high temperatures being involved in the process, films can be obtained without any deviation from the stoichiometric composition which has previously been a critical problem in the formation of sulfides, selenides and the like compounds.

The inventive method is also advantageous in that it allows use of substrates differing in material and in configuration. For example, use of a substrate of glass coated with a transparent conducting $SnO_2$ film facilitates the manufacture of photoconductive cells and photovoltaic cells. Also, heterojunctions and solid solutions can be obtained with ease by use of substrates of other semiconductor materials. Moreover, according to the invention, films can be formed in different patterns by photoetching means based upon the fact that the deposited film is adhering extremely fast to the substrate, and this apparently makes the method highly valuable in production of thin film transistors or solid-state circuits. Also, according to the inventive method, luminescence films and filters can be obtained by adding appropriate impurities. It will thus be apparent that the inventive method can be utilized to form films of chemical compounds for widely different applications and is highly valuable from the industrial viewpoint.

What we claim is:

1. A method of making films of inorganic compounds including sulfide, selenide or sulfoselenide of at least one of the elements of Groups I–B, II–B and III–A of the Periodic Table, comprising the steps of adding ammonia water to an aqueous solution including at least one compound selected from the group consisting of thiourea, selenurea and dimethyl selenurea as an homogeneous precipitant, and heating the system to a temperature sufficient to cause the sulfide, selenide or sulfoselenide of the element selected from Groups I–B, II–B or III–A to deposit as a film on a substrate immersed in the system.

2. A method according to claim 1, wherein each salt is selected from the group consisting of nitrates, chlorides, sulfates and bromides.

3. A method according to claim 2, wherein said element is cadmium.

4. A method according to claim 1, wherein said element is a member of Group II–B of the Periodic Table.

5. A method of making films of inorganic compounds including the sulfide, selenide or sulfoselenide of at least one of the elements of Groups I–B, II–B and III–A of the Periodic Table, comprising the steps of adding to an aqueous solution including at least one water soluble salt of the elements of groups I–B, II–B and III–A ammonia water together with a buffer solution to form a soluble complex compound, adding to the resulting solution an aqueous solution including at least one compound selected from the group consisting of thiourea, selenurea and dimethyl selenurea as an homogeneous precipitant, and heating the system to a temperature sufficient to cause the sulfide, selenide or sulfoselenide of the element selected from Group I–B, II–B or III–A to deposit as a film on a substrate immersed in the system.

6. A method according to claim 5, wherein each salt is selected from the group consisting of nitrates, chlorides, sulfates and bromides.

7. A method according to claim 6, wherein said element is cadmium.

8. A method according to claim 5, wherein said element is a member of Group II–B of the Periodic Table.

References Cited

UNITED STATES PATENTS 3,284,235  11/1966  Van Santen et al. ____ 117—201

WILLIAM L. JARVIS, Primary Examiner

U.S. Cl. X.R.

252—623, 501